(12) United States Patent
Aines

(10) Patent No.: US 8,992,845 B2
(45) Date of Patent: Mar. 31, 2015

(54) CATALYST FUNCTIONALIZED BUFFER SORBENT PEBBLES FOR RAPID SEPARATION OF CARBON DIOXIDE FROM GAS MIXTURES

(71) Applicant: Lawrence Livermore National Security, LLC, Livermore, CA (US)

(72) Inventor: Roger D. Aines, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 13/758,787

(22) Filed: Feb. 4, 2013

(65) Prior Publication Data

US 2013/0149768 A1   Jun. 13, 2013

Related U.S. Application Data

(62) Division of application No. 12/783,394, filed on May 19, 2010, now Pat. No. 8,394,350.

(60) Provisional application No. 61/182,005, filed on May 28, 2009.

(51) Int. Cl.
| | |
|---|---|
| *F01N 3/08* | (2006.01) |
| *C12N 11/00* | (2006.01) |
| *B01J 31/00* | (2006.01) |
| *B01D 53/62* | (2006.01) |
| *B01D 53/86* | (2006.01) |
| *B01J 35/02* | (2006.01) |

(52) U.S. Cl.
CPC ............... *B01J 31/003* (2013.01); *B01D 53/62* (2013.01); *B01D 53/864* (2013.01); *B01J 35/02* (2013.01); *B01D 53/86* (2013.01); *B01D 2253/206* (2013.01); *B01D 2255/00* (2013.01); *B01D 2257/504* (2013.01); *Y02C 10/04* (2013.01)
USPC ............. 422/178; 422/168; 422/177; 96/143; 96/146; 96/290; 435/174; 435/176; 435/177

(58) Field of Classification Search
USPC .......... 502/400–403, 439; 423/220, 226, 230; 435/174, 176, 177
See application file for complete search history.

(56) References Cited

U.S. PATENT DOCUMENTS

| | | | |
|---|---|---|---|
| 5,876,488 A | 3/1999 | Birbara | |
| 7,132,090 B2 * | 11/2006 | Dziedzic et al. | ............ 423/230 |
| 2007/0169625 A1 | 7/2007 | Aines | |
| 2009/0000476 A1 | 1/2009 | Saito | |
| 2009/0145297 A1 | 6/2009 | Ferguson | |

* cited by examiner

*Primary Examiner* — Stanley Silverman
*Assistant Examiner* — Daniel Berns
(74) *Attorney, Agent, or Firm* — Eddie E. Scott

(57) ABSTRACT

A method for separating $CO_2$ from gas mixtures uses a slurried media impregnated with buffer compounds and coating the solid media with a catalyst or enzyme that promotes the transformation of $CO_2$ to carbonic acid. Buffer sorbent pebbles with a catalyst or enzyme coating are provided for rapid separation of $CO_2$ from gas mixtures.

4 Claims, 5 Drawing Sheets

CATALYST FUNCTIONALIZED BUFFER SORBENT PEBBLES FOR RAPID SEPARATION OF CARBON DIOXIDE FROM GAS MIXTURES

CROSS-REFERENCE TO RELATED APPLICATIONS

The present application is a divisional of pending U.S. application Ser. No. 12/783,394, filed May 19, 2010, entitled "Catalyst Functionalized Buffer Sorbent Pebbles for Rapid Separation of Carbon Dioxide from Gas Mixtures," which is a non-provisional application of U.S. Provisional Application No. 61/182,005 filed May 28, 2009, entitled "catalyst functionalized buffer sorbent pebbles for rapid separation of $CO_2$ from gas mixtures," the disclosure of which is hereby incorporated by reference in its entirety for all purposes.

This application is related to co-pending U.S. patent application Ser. No. 12/474,595 filed May 29, 2009 titled "slurried solid media for simultaneous water purification and carbon dioxide removal from gas mixtures" and U.S. Provisional Patent Application No. 61/181,999 filed May 28, 2009 entitled "catalyst functionalized buffer sorbent pebbles for rapid separation of $CO_2$ from gas mixtures," the disclosures of which are hereby incorporated herein by this reference.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to carbon dioxide removal, and more particularly, the present invention relates to catalyst functionalized buffer sorbent pebbles for rapid separation of $CO_2$ from gas mixtures.

2. State of Technology

United States Published Patent Application No. 2007/0169625 by Roger D. Aines and William L. Bourcier for a carbon ion pump for removal of carbon dioxide from combustion gas and other gas mixtures provides the state of technology information described below. Carbon dioxide makes up from 5% (modern gas-fired plants) to 19% (modern coal plants) of the flue gas from a power plant. The remainder is mostly nitrogen, unused oxygen, and oxides of nitrogen and sulfur (which are strong greenhouse gases in addition to contributing to poor quality). A major limitation to reducing greenhouse gases in the atmosphere is the expense of stripping carbon dioxide from other combustion gases. Without a cost-effective means of accomplishing this, the world's hydrocarbon resources, if used, will continue to contribute carbon dioxide to the atmosphere. The disclosure of United States Published Patent Application No. 2007/0169625 is incorporated herein in its entirety for all purposes.

United States Published Patent Application No. 2007/0170060 by William L. Bourcier, Roger D. Aines, Jeffery, J. Haslam, Charlene, M. Schaldach, Kevin, C. O'Brien, and Edward Cussler for a deionization and desalination using electrostatic ion pumping provides the state of technology information described below. The present invention provides for a method and system (e.g., a desalination system and method) that utilizes synchronized externally applied electrostatic fields in conjunction with an oscillating fluid flow to immobilize and separate ions from fluids. While salt ion removal from water is a preferred embodiment, it is to be understood that other ions can also be beneficially removed from fluids, as disclosed herein by the apparatus/systems and methods of the present invention. The ion pump separates any non-ionic liquid, from ionic impurities contained within that liquid. The present invention may therefore be used to purify either the liquid, as in the case of water, or the salts. One outlet stream has liquid reduced in salt content, and the other side it is increased and this side is useful if the valuable product is the salt, and not the fluid. In addition, many drugs are inherently ionic chemicals that can be separated by the methods disclosed herein from a liquid in which they have been created. As another beneficial embodiment, the methods and apparatus/system can be configured to separate valuable minerals, such as, but not limited to lithium. Conventionally, the separation of ions and impurities from electrolytes has been achieved using a variety of processes including: ion exchange, reverse osmosis, electro dialysis, electrodeposition, and filtering. In conventional reverse osmosis systems, for example, water is forced through a membrane, which acts as a filter for separating the ions and impurities from water. Reverse osmosis systems require significant energy to move the water through the membrane. The flux of water through the membrane results in a considerable pressure drop across the membrane. This pressure drop is responsible for most of the energy consumption by the process. The membrane also degrades with time, requiring the system to be shut down for costly and troublesome maintenance. The disclosure of United States Published Patent Application No. 2007/0169625 is incorporated herein in its entirety for all purposes.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

Most industrial process for separating $CO_2$ from gas mixtures utilize water as the primary separation media. This is because water provides an extremely large factor to separated carbon dioxide from non-ionizable nitrogen and oxygen. In those processes the water contains additives that serve to buffer the carbonic acid that forms upon $CO_2$ dissolution, and also to speed the $CO_2$ dissolution process. Typically those additives are amines although in some processes hydroxides (such as NaOH) are used.

The present invention improves on that practice by isolating the buffering compounds in small, self contained units such as acrylic beads. This solves a significant challenge in the normal process of carbon dioxide separation by facilitating the recycling of the buffer compounds. In conventional methods, the carbon dioxide is typically recovered from the buffered solution by heating it to temperatures around 130° C., releasing carbon dioxide and steam, which are then readily separated from each other by condensing the steam.

The present invention provides a slurried solid media for carbon dioxide removal from gas mixtures.

The present invention's pelletized and separate buffer media is easily filtered from the solution for return use. This then facilitates a major improvement upon the standard practice; with the buffer media separated from the fluid, it is possible to recover purified water from the thermal recovery of the carbon dioxide. The present invention simplifies the necessary re-use of the buffer media and permits the use of brines or other lower-value water sources as the feed stock to the process. The solid media may be pumped through a chemical system, mimicking the current use of dissolved buffers like amines. As a secondary benefit, the carbon dioxide is recovered at lower temperatures of 100° C. in this process, a significant improvement over current practice.

The present invention provides catalyst functionalized buffer sorbent pebbles for rapid separation of $CO_2$ from gas mixtures. The present invention provides a method for separating $CO_2$ from gas mixtures using solid, slurried media impregnated with buffer compounds and the present invention improves upon the method by coating the solid media with a catalyst or enzyme that promotes the transformation of $CO_2$ to carbonic acid. This greatly speeds the uptake of $CO_2$ by the buffered solid media.

The terms "sorbent pebble" and "sorbent pebbles" as used in this application means any media that can be coated or impregnated with the catalyst or enzyme that promotes the transformation of $CO_2$ to carbonic acid of the present invention. The media includes solid media, semi-solid media, and other media. Examples include an individual pebble, pebbles, piece, particle, particles, lumps, powder, slag, slab, ball, pill, wad, grain, and clump.

The present invention has the following commercial or other uses: separating carbon dioxide from flue (combustion) gases; separating carbon dioxide from natural gas; separating carbon dioxide from the effluent gases of industrial processes; separating carbon dioxide directly from the atmosphere; and creating fresh water while separating carbon dioxide from gas mixtures.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Figure 1:
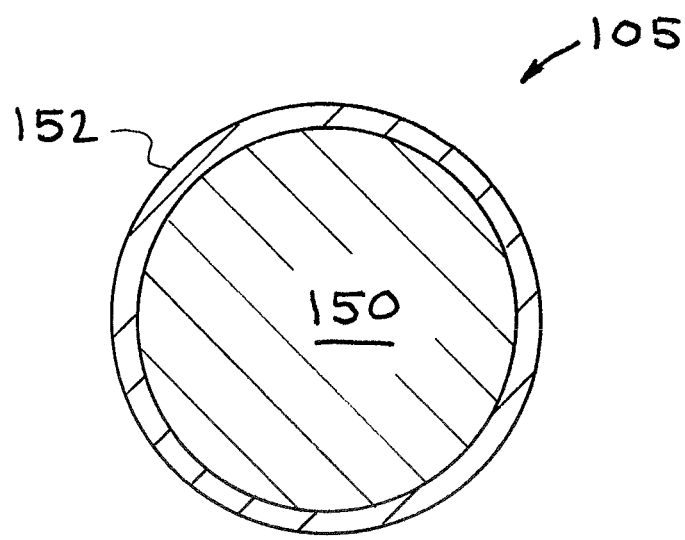
FIG. 1 is an illustration of a sorbent pebble constructed in accordance with the present invention.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Industrial supplies of carbon dioxide come from natural geologic sources, ammonia and syngas production, and cryogenic air distillation. These sources have obviated the need to retrieve carbon dioxide from air for large-scale application in commerce and industry. Carbon dioxide makes up from 5% (modern gas-fired plants) to 18% (modern coal plants) of the flue gas from a power plant. The remainder is mainly nitrogen and unused oxygen. $CO_2$ in natural gas is an important process issue, as it commonly occurs at concentrations of up to 50% in the natural reservoirs of methane, but natural gas for sale in pipelined systems can contain only a few percent of carbon dioxide.

When the initial mixture of gases is available at high pressure, pressure-swing absorption methods using physical solvents are the separation method of choice. (Physical solvents are defined as those that do not change the chemical state of the gases being separated.) In general, the compression cost is too large for gases initially available at low pressures. Some membrane and zeolite filtration methods are used but tend to be more effective for removing the $CO_2$ from a gas stream to be purified, than generating a pure $CO_2$ stream. The difficulty in all these methods is that the carbon dioxide molecule is of similar size to oxygen and nitrogen, and is therefore hard to separate on that basis alone.

Many industrial carbon dioxide separation schemes utilize water as the primary separation media, with additives such as amine compounds to increase the rate or capacity. This is because water provides an extremely large factor to separate carbon dioxide from non-ionizable nitrogen and oxygen. These gases are limited to solubilities of around 40 ppm in water—but with appropriate chemical control the ionized species bicarbonate $HCO_3^-$ and carbonate $CO_3^{2-}$ can have concentrations thousands of times higher. In other words, once the $CO_2$ dissolves in water, it is now a very different molecule than oxygen and nitrogen, with concordant high separation efficiency.

The speciation of carbon dioxide in water is therefore critical to the achieved concentration. The following two distinct concentration regions have been identified:

Region #1—Below pH 5: dissolved carbon dioxide is low because the unionized species predominate. Total dissolved $CO_2$ can only be increased by increasing the gas pressure of $CO_2$ above the water. This is the carbonated beverage regime—the gas comes out when the pressure is released.

Region #2—Above pH 5: the concentration, and potentially the transfer rate, can be increased by adding a pH buffer to the solution that binds to the protons released which are released in the conversion

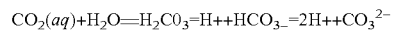

These buffer compounds are fundamentally required to keep the water solution in the correct pH region for the conversion of $CO_2$ to carbonate or bicarbonate ion. However, the buffering cation (for instance $NH_4^+$) also has an affinity to bond with the carbonate or bicarbonate ion. In releasing the carbonate or bicarbonate ion, this affinity must be overcome, resulting in a chemical energy demand. This chemical affinity causes some confusion where it can be confused with the buffering potential and regarded as the primary benefit of the buffer compound. In fact the affinity has no general benefit in the process and is generally a hindrance to low-cost operation. The buffer compounds only function is to keep the pH within the proper range for $CO_2$ to convert to carbonate or bicarbonate which allows very high solubility in water. The water itself is the separating medium.

The relative tradeoffs among these chemical factors have led to a focus on the use of dissolved amines and substituted amines (such as diethanolamine (DEA), or methyldiethanolamine (MDEA)) to provide high buffering capacity in the water, and relatively high dissolution rates at pHs of 9-10. There are relatively few buffer compounds that function in this region—almost all are amines or pure ammonia. They provide the pH regime described above and therefore allow large amounts of $CO_2$ to enter solution (up to one molecule of $CO_2$ for each molecule of buffer solution). However recycling of the amine-$CO_2$ solution requires high temperatures, typically 130° C. This results in degradation of the amines and some volatilization of the amines and their degradation products. The cost of recycling the amine systems is substantial both in terms of energy required to remove the $CO_2$ and in terms of the periodic replacement and disposal of the degraded amine itself. A substantial effort has gone into the development of proprietary amine systems that can be regenerated at lower temperatures (typically 120° C.) and which are resistant to degradation through the use of additives, or chemical modifications that stabilize the amine. For instance the Fluor Econamine is based on the use of a 30 wt % aqueous MEA (Mono-Ethanolamine) solvent and incorporates inhibitors to counter the corrosion effects caused by high levels of oxygen in the flue gas. Other providers of proprietary amine systems include Mitsubishi Heavy Industries (their process is called KS-1) and Cansolve Technologies with a tertiary amine solvent called DC103. Several processes use ammonia in place of substituted amines. This generally results in a lower energy demand for the regeneration step but is limited by the volatilization and loss of the ammonia. Alstom Corporation is testing a chilled ammonia process (CAP) that operates near the freezing point of water.

Some work has been done on immobilized amines. These systems use similar chemicals to the solution-based amine systems but immobilized in a variety of porous matrixes. This work derived from submarine and spacecraft air cleaning systems, where the breathing air is scrubbed of $CO_2$ by passing over a bed of the solid sorbent where it has the advantage of not releasing the buffer compound to the breathing air. The bed is then heated with steam (submarines) or exposed to the vacuum of space to remove the adsorbed $CO_2$. A limitation of these systems is that they rely on moisture in the gas stream to provide a minimal amount of water to allow the bicarbonate/carbonate reaction. When the gas stream being treated is rigorously dry, a third reaction to carbamate ion can occur, but is much less efficient. Thus while these solid systems have the advantage of not releasing the volatile or semivolatile buffer compound, they lose some of the efficiency advantages of the aqueous systems and are not currently regarded as effective for flue gas treatment.

Thus some of the principal problems faced by currently available water-based $CO_2$ separation systems are:
1. Volatility of the buffer chemical (principally amines or ammonia).
2. Oxidation and breakdown of the buffer chemical.
3. High temperatures (>130° C.) required to desorb the carbonate or bicarbonate ion from the buffered solution.

Inability to use the thermal process to recover fresh water from the necessary steam produced during regeneration of the media.

The present invention provides catalyst functionalized buffer sorbent pebbles for rapid separation of $CO_2$ from gas mixtures. The present invention provides a method for separating $CO_2$ from gas mixtures using solid, slurried media impregnated with buffer compounds and the present invention improves upon the method by coating the solid media with a catalyst or enzyme that promotes the transformation of $CO_2$ to carbonic acid. This greatly speeds the uptake of $CO_2$ by the buffered solid media.

One embodiment of the present invention provides a slurried solid media for simultaneous water purification and carbon dioxide removal from gas mixtures. The method includes the steps of dissolving the gas mixture and carbon dioxide in water providing a gas, carbon dioxide, water mixture; adding a porous solid media to the gas, carbon dioxide, water mixture forming a slurry of gas, carbon dioxide, water, and porous solid media; heating the slurry of gas, carbon dioxide, water, and porous solid media producing steam; and cooling the steam to produce purified water and carbon dioxide.

In another embodiment of the present invention, a gas mixture is introduced to a fluidized bed reactor containing slurried pebbles. The fluidized bed is made up of sorbent pebbles. The sorbent pebbles include a sorbent pebble body and a surface layer with an attached or embedded catalyst or enzyme. Carbon dioxide is absorbed by passing the gas mixture from which the carbon dioxide is to be separated through the fluidized bed. The carbon dioxide can be transported to an injection site for sequestration and long-term storage in any of a variety of suitable geologic formations.

The porous solid media can be any suitable porous solid media, for example, the porous solid media can be an ion exchange amine support resin. Another example of the porous solid media can be the ion exchange resin amberlite. Other examples of the porous solid media are described in U.S. Pat. No. 5,876,488 to Philip J. Birbara et al for regenerable solid amine sorbent. The disclosure of U.S. Pat. No. 5,876,488 is incorporated herein in its entirety for all purposes.

Referring now to the drawings, and in particular to FIG. 1, an embodiment of a sorbent pebble constructed in accordance with the present invention is illustrated. The sorbent pebble is designated generally by the reference numeral 105. The sorbent pebble 105 includes a sorbent pebble body 150 and a surface layer 152 with an attached or embedded catalyst or enzyme.

The sorbent pebble body 150 is made of a material that absorbs carbon dioxide. The sorbent pebble body 150 can be made of any material that absorbs carbon dioxide. For example, materials that absorb carbon dioxide can be any of the materials for $CO_2$ absorption described and illustrated in United States Published Patent Application No. 2009/0145297 for $CO_2$ absorption by solid materials and United States Published Patent Application No. 2009/0000476 for carbon dioxide absorbent and carbon dioxide absorbent method using same. United States Published Patent Application No. 2009/0145297 for $CO_2$ absorption by solid materials and United States Published Patent Application No. 2009/0000476 for carbon dioxide absorbent and carbon dioxide absorbent method using same are incorporated herein in its entirety for all purposes by this reference.

The surface layer 152 is made of a catalyst material or an enzyme. The catalyst material or an enzyme attached or embedded in the sorbent pebble body 150. Alternatively, the catalyst or enzyme can be distributed throughout the pebble body 150 but that is not optimal. The surface layer 152 can be made of any material that provides a catalyst or enzyme. For example, materials for the catalyst or enzyme 152 can be material that promotes the transformation of $CO_2$ to carbonic acid and may be any of the naturally occurring carbonic anhydrases, derivatives of those enzymes, or any of the synthetic catalysts. The thickness of the catalyst or enzyme layer 152 can be varied.

Examples of the slurried solid media for simultaneous water purification and carbon dioxide removal from gas mixtures method of the present invention are described below.

Example 2A

Figure 2A:
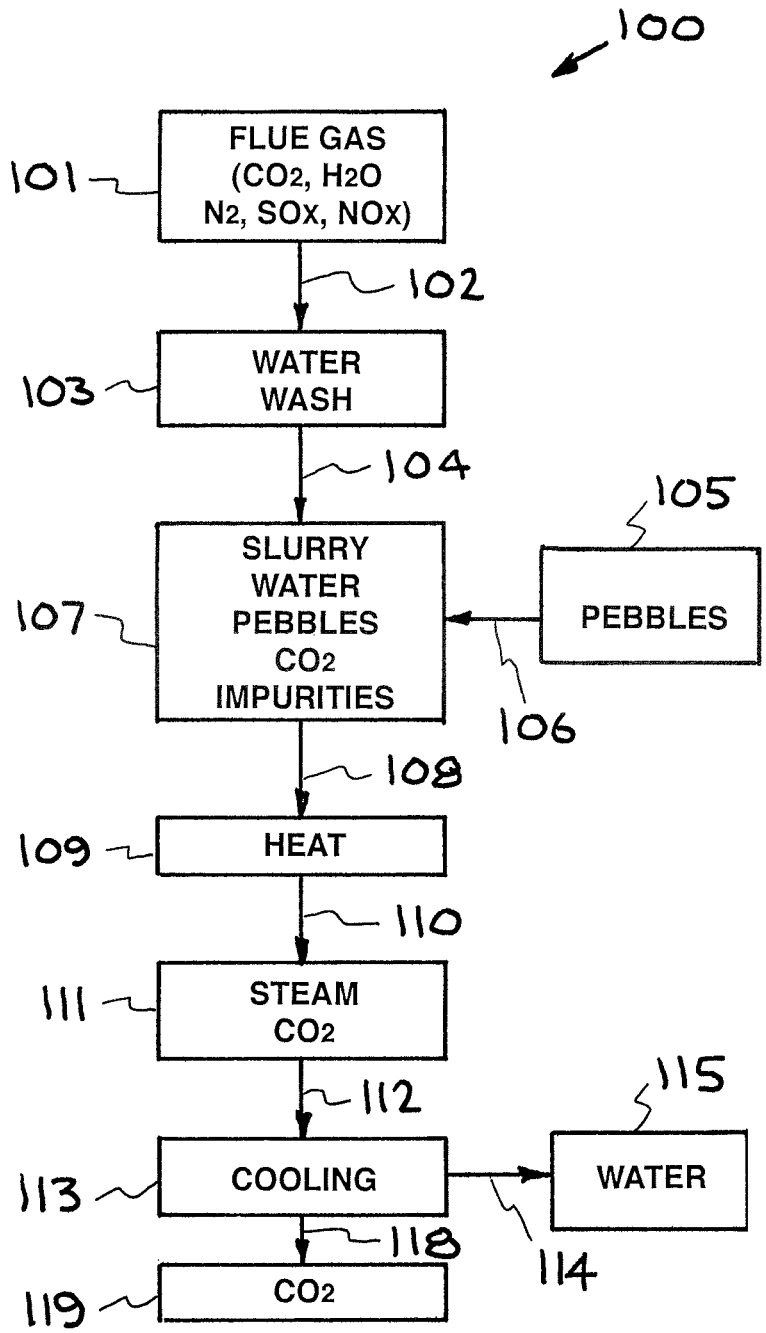
FIGS. 2A and 2B are flow charts illustrating embodiments of methods of the present invention.

Referring now to FIG. 2A one embodiment of a method of the present invention is illustrated. This embodiment of a method of the present invention is designated generally by the reference numeral 100. FIG. 2A is a flow chart showing steps of a first embodiment of a first slurried solid media for simultaneous water purification and carbon dioxide removal from gas mixtures. The steps of the method 100 are described below.

Method Steps—FIG. 2A

Step 1 (Reference Numeral 102)—Flue gas (e.g., $CO_2$, $H_2O$, $N_2$, $SO_x$, $NO_x$) and/or other gas mixtures 101 is processed in a water wash 103. The system/process 100 is thus designed to dissolve flue gas (e.g., $CO_2$, $H_2O$, $N_2$, $SO_x$, $NO_x$) and/or other gas mixtures first in slightly alkaline water as introduced by the water wash 103 prior to producing a concentrate from which a harvested $CO_2$ can be produced. The water wash 103 system itself can be incorporated from known systems utilized by those of ordinary skill in the art. As an illustration only, the common system can include a plurality of spray levels to inject the liquid so as to contact the flue gas, which is designed to flow through such a water wash 103 at a predetermined constant velocity. The number of spray levels can be varied depending on the effective liquid to gas (L/G) ratios. In addition, spray nozzles of different sizes producing different flow rates, spray patterns, and droplet sizes can also be utilized.

Step 2 (Reference Numeral 104)—The water containing the flue gas passes from water wash 103 to an area wherein a porous solid media 105 is added as represented by the arrow 106 forming a slurry 107 of water, porous solid media, $CO_2$, and the impurities. In one embodiment a buffering compound, typically a substituted amine, in a porous solid bead 105 of the type used to create ion exchange media. The beaded media 105 act as a mobile but separate buffering compound, and may be pumped or handled as a slurry. The porous media may be created in the same manner as is currently used to create ion exchange media. In application, the beaded media 105 containing the amine or ammonia compound is handled as a slurry 107. The sorbent pebble 105 includes a sorbent pebble body 150 and a surface layer 152 with an attached or embedded catalyst or enzyme. One embodiment of the sorbent pebble 105 is illustrated in FIG. 1 and described above. Carbon dioxide is absorbed by passing the gas from which the carbon dioxide is to be separated through the slurry 107 either by bubbling, use of an absorber tower, or any other means suitable for absorbing a gas into a liquid. The process for absorbing carbon dioxide or other acid gases is similar to the process used in amine stripping.

The mixed gas is passed through or over a solution of the water containing the beaded media 105 with the buffer media. This step charges the solid media 105 with carbon dioxide. The buffer media is composed of any solid or semi solid material capable of holding the buffering chemical. The buffer may be any chemical providing buffering between the range of pH 7 and pH-14. However optimally the buffering chemical will buffer in the vicinity of pH 9. The amount of buffer held in the solid media determines the capacity of the system, typically one mole of carbon dioxide as bicarbonate in at pH less than 10 per mole of buffer capacity, or one half mole of carbon dioxide as carbonate above pH 10. The water is any water which is desired to be purified during the desorption step. This can be seawater, brine, water compromised by any low-volatility salt or other dissolved component. The water can also be a process fluid that is 100% recycled (not purified) during the desorption stage, but this is less than optimal. The $CO_2$ or other acid gases dissolve in the water and are then absorbed by the buffered solid media 105, permitting more to dissolve into the water until saturation is reached. In other embodiments, the flue gas can be introduced directly to a mixture of the water and pebbles, either by bubbling into the slurry, a more sophisticated fluidized bed reactor (where the bed is the slurried pebbles and the flue gas provides the fluidization), or by a hybrid spray system where the pebbles are part of the spray system. For instance, a system that looks like a cooling tower, with the flue gas passing upward past falling water containing the sorbent pebbles can be used.

Step 3 (Reference Numerals 108, 109, 110, & 111)—The mixture of solid media containing the $CO_2$ is then heated 109 to the boiling point of water (typically 100° C.) to release the $CO_2$ from the solid media 105. During the heating 109 step steam 111 is produced. In order to desorb the carbon dioxide, much lower temperatures are required than if the same amines are used free in solution. Carbon dioxide is freely evolved at slightly below 100° C. in pure water. This is because there is relatively little carbon dioxide gas in the water (it's partial pressure (fugacity) is lower). Therefore the desorption reaction $HCO_3$—$R_3NH+$—$CO_2+H2O+R3N$ (where R is any substitution group) is now strongly favored to go the right with temperature, as the $CO_2$ gas generated is rapidly swept out of the system by steam generated from boiling water. This occurs just slightly below the boiling point of pure water, as the system will boil when the total gas pressure exceeds the confining pressure. Total gas pressure is the sum of the $CO_2$ gas evolving from the beads and steam generated from heating water.

Step 4 (Reference Numerals 112 & 113)—The steam 111 is condensed by cooling 113.

Step 5 (Reference Numerals 114 & 115)—Condensing of the steam 111 produces fresh water 115. With a buffer media that is easily separable (by filtration) from the working liquid medium, it is now possible to use a brine or other compromised water as the feedstock. During the regeneration step, the steam which must necessarily be produced can be condensed as fresh water obtaining dual benefit for the energy required to regenerate the $CO_2$. None of the buffer material carries over into the distillate unlike the fairly volatile amines currently used. Most importantly, as the undesirable components of the process water (for instance salt) build up in the bottom of the distilling process, they may periodically be removed and the buffer material easily filtered out from the rejected components for return to the process. This cannot be done easily with any of the dissolved buffer materials currently in use. One advantage is longer buffer life by reduced temperatures and isolation of the buffer material from oxygen.

Step 6 (Reference Numerals 118 & 119)—Condensing of the steam 111 purifies the gas stream coming out of the process to nearly pure $CO_2$ 119. The $CO_2$ 119 can be used or sequestered. The $CO_2$ 119 can be transported to an injection site for sequestration and long-term storage in any of a variety of suitable geologic formations.

Example 2B

Figure 2B:
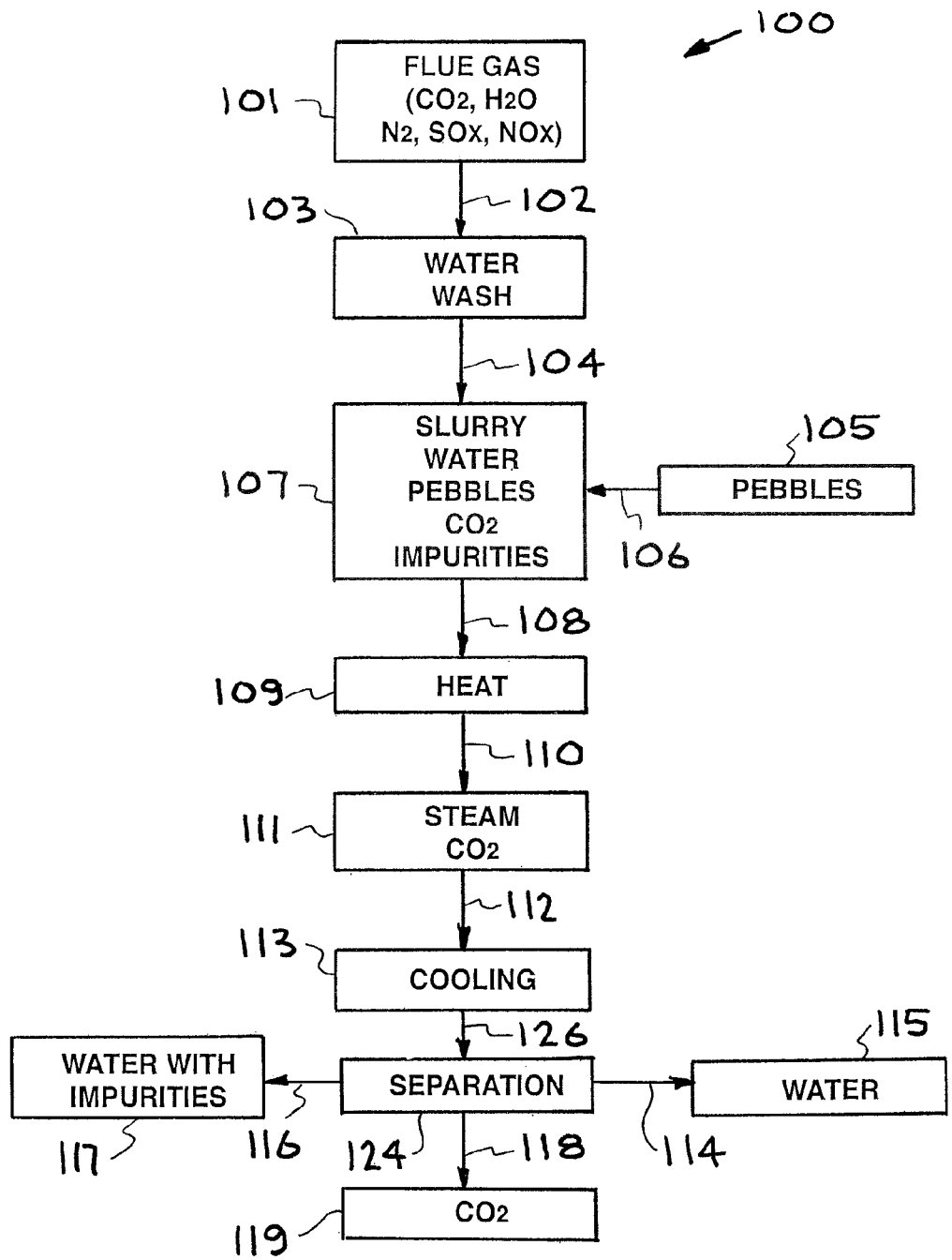

Referring now to FIG. 2B another embodiment of a method of the present invention is illustrated. This embodiment of a method of the present invention is designated generally by the reference numeral 100. FIG. 2B is a flow chart showing steps of a first embodiment of a first slurried solid media for simultaneous water purification and carbon dioxide removal from gas mixtures. The steps of the method 100 are described below.

Method Steps—FIG. 1

Step 1 (Reference Numeral 102)—Flue gas (e.g., $CO_2$, $H_2O$, $N_2$, $SO_x$, $NO_x$) and/or other gas mixtures 101 is processed in a water wash 103. The system/process 100 is thus designed to dissolve flue gas (e.g., $CO_2$, $H_2O$, $N_2$, $SO_x$, $NO_x$) and/or other gas mixtures first in slightly alkaline water as introduced by the water wash 103 prior to producing a concentrate from which a harvested $CO_2$ can be produced. The water wash 103 system itself can be incorporated from known systems utilized by those of ordinary skill in the art. As an illustration only, the common system can include a plurality of spray levels to inject the liquid so as to contact the flue gas, which is designed to flow through such a water wash 103 at a predetermined constant velocity. The number of spray levels can be varied depending on the effective liquid to gas (L/G) ratios. In addition, spray nozzles of different sizes producing different flow rates, spray patterns, and droplet sizes can also be utilized.

Step 2 (Reference Numeral 104)—The water containing the flue gas passes from water wash 103 to an area wherein a porous solid media 105 is added as represented by the arrow 106 forming a slurry 107 of water, porous solid media, $CO_2$, and the impurities. In one embodiment a buffering compound, typically a substituted amine, in a porous solid bead 105 of the type used to create ion exchange media. The beaded media 105 act as a mobile but separate buffering compound, and may be pumped or handled as a slurry. The porous media may be created in the same manner as is currently used to create ion exchange media. In application the beaded media 105 containing the amine or ammonia compound is handled as a slurry 107. The sorbent pebble 105 includes a sorbent pebble body 150 and a surface layer 152 with an attached or embedded catalyst or enzyme. One embodiment of the sorbent pebble 105 is illustrated in FIG. 1 and described above. Carbon dioxide is absorbed by passing the gas from which the carbon dioxide is to be separated through the slurry 107 either by bubbling, use of an absorber tower, or any other means suitable for absorbing a gas into a liquid. The process for absorbing carbon dioxide or other acid gases is similar to the process used in amine stripping.

The mixed gas is passed through or over a solution of the water containing the beaded media 105 with the buffer media. This step charges the solid media 105 with carbon dioxide. The buffer media is composed of any solid or semi solid material capable of holding the buffering chemical. The buffer may be any chemical providing buffering between the range of pH 7 and pH-14. However optimally the buffering chemical will buffer in the vicinity of pH 9. The amount of buffer held in the solid media determines the capacity of the system, typically one mole of carbon dioxide as bicarbonate in at pH less than 10 per mole of buffer capacity, or one half mole of carbon dioxide as carbonate above pH 10. The water is any water which is desired to be purified during the desorption step. This can be seawater, brine, water compromised by any low-volatility salt or other dissolved component. The water can also be a process fluid that is 100% recycled (not purified) during the desorption stage, but this is less than optimal. The $CO_2$ or other acid gases dissolve in the water and are then absorbed by the buffered solid media 105, permitting more to dissolve into the water until saturation is reached. In other embodiments the flue gas can be introduced directly to a mixture of the water and pebbles, either by bubbling into the slurry, a more sophisticated fluidized bed reactor (where the bed is the slurried pebbles and the flue gas provides the fluidization), or by a hybrid spray system where the pebbles are part of the spray system. For instance, a system that looks like a cooling tower, with the flue gas passing upward past falling water containing the sorbent pebbles can be used.

Step 3 (Reference Numerals 108, 109, 110, & 111)—The mixture of solid media containing the $CO_2$ is then heated 109 to the boiling point of water (typically 100° C.) to release the $CO_2$ from the solid media 105. During the heating 109 step steam 111 is produced. In order to desorb the carbon dioxide much lower temperatures are required than if the same amines are used free in solution. Carbon dioxide is freely evolved at slightly below 100° C. in pure water. This is because there is relatively little carbon dioxide gas in the water (it's partial pressure (fugacity) is lower). Therefore the desorption reaction $HCO_3$—$R_3NH+$—$CO_2+H_2O+R3N$ (where R is any substitution group) is now strongly favored to go the right with temperature, as the $CO_2$ gas generated is rapidly swept out of the system by steam generated from boiling water. This occurs just slightly below the boiling point of pure water, as the system will boil when the total gas pressure exceeds the confining pressure. Total gas pressure is the sum of the $CO_2$ gas evolving from the beads and steam generated from heating water.

Step 4 (Reference Numerals 112 & 113)—The steam 111 is condensed by cooling 113.

Step 5 (Reference Numerals 114, 115, 124, & 126)—The cooling of the steam results in condensing 126 of the steam 111 and produces water 115, water with impurities 117, and carbon dioxide 119. Separation 124 of the water 115, water with impurities 117, and carbon dioxide 119 in step 114 produces fresh water 115. With a buffer media that is easily separable (by filtration) from the working liquid medium, it is now possible to use a brine or other compromised water as the feedstock. During the regeneration step the steam which must necessarily be produced can be condensed as fresh water obtaining dual benefit for the energy required to regenerate the $CO_2$. None of the buffer material carries over into the distillate unlike the fairly volatile amines currently used. Most importantly, as the undesirable components of the process water (for instance salt) build up in the bottom of the distilling process, they may periodically be removed and the buffer material easily filtered out from the rejected components for return to the process. This cannot be done easily with any of the dissolved buffer materials currently in use. One advantage is longer buffer life by reduced temperatures and isolation of the buffer material from oxygen.

Step 6 (Reference Numerals 118 & 119)—Condensing of the steam 111 in cooling step 113 purifies the gas stream coming out of the process to nearly pure $CO_2$ designated by the reference numeral 119. The $CO_2$ 119 can be used or sequestered. The $CO_2$ 119 can be transported to an injection site for sequestration and long-term storage in any of a variety of suitable geologic formations.

Step 7 (Reference Numerals 116 & 117)—Condensing of the steam 111 in cooling step 113, with removal of the $CO_2$ 119 and water 115, leaves water with impurities 117.

Example 3

Figure 3:
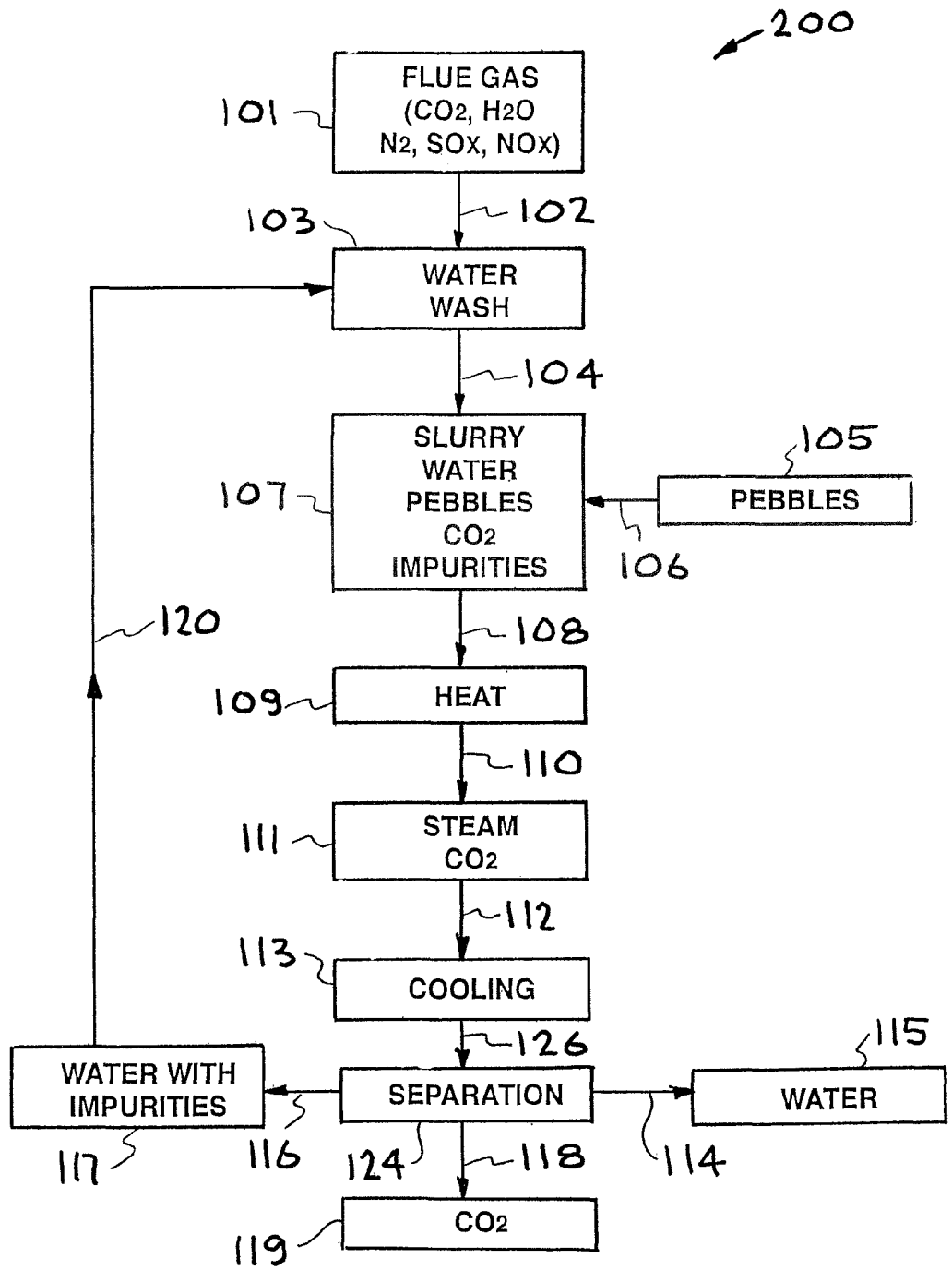
FIG. 3 is a flow chart illustrating another embodiment of a method of the present invention.

Referring now to FIG. 3 another embodiment of a method of the present invention is illustrated. This embodiment of a method of the present invention is designated generally by the reference numeral 200. FIG. 3 is a flow chart showing steps of a first embodiment of a first slurried solid media for simultaneous water purification and carbon dioxide removal from gas mixtures. The steps of the method 200 are described below.

Method Steps—FIG. 3

Step 1 (Reference Numeral 102)—Flue gas 101 is processed in water wash 103.

Step 2 (Reference Numeral 104)—The water containing the flue gas passes from water wash 103 to an area wherein a porous solid media 105 is added as represented by the arrow 106 forming a slurry 107 of water porous solid media, $CO_2$, and the impurities.

Step 3 (Reference Numerals 108, 109, 110, & 111)—The mixture of solid media containing the $CO_2$ is then heated 109 to the boiling point of water to release the $CO_2$ from the solid media 105. During the heating 109 step steam 111 is produced.

Step 4 (Reference Numerals 112 & 113)—The steam 111 is condensed by cooling 113.

Step 5 (Reference Numerals 114 & 115)—Condensing of the steam 111 produces fresh water 115.

Step 6 (Reference Numerals 118 & 119)—Condensing of the steam 111 purifies the gas stream coming out of the process to nearly pure $CO_2$ 119. The $CO_2$ 119 can be used or sequestered. The $CO_2$ 119 can be transported to an injection site for sequestration and long-term storage in any of a variety of suitable geologic formations.

Step 7 (Reference Numerals 116 & 117)—Condensing of the steam 111 with removal of the $CO_2$ 119 and water 115 leaves water with impurities 117.

Step 8 (Reference Numeral 120)—The water with impurities 117 is transferred to the water wash 103.

Example 4

Figure 4:
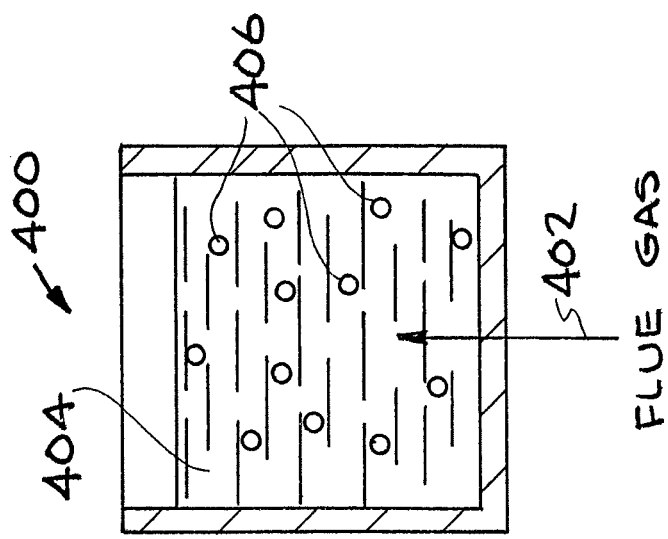
FIG. 4 illustrates an embodiment wherein flue gas is introduced directly to a mixture of the water and pebbles by bubbling into the slurry.

Referring now to FIG. 4 another embodiment of a method of the present invention is illustrated. This embodiment of a method of the present invention is designated generally by the reference numeral 400. FIG. 4 is an illustration showing a slurried solid media system for carbon dioxide removal from gas mixtures. As illustrated in FIG. 4 flue gas 402 is bubbled through a slurry of water 404 and sorbent pebbles 406. The sorbent pebbles 406 include a sorbent pebble body and a surface layer with an attached or embedded catalyst or enzyme. One embodiment of the sorbent pebble 406 is illustrated in FIG. 1 and described above. Carbon dioxide is absorbed by passing the flue gas 402 from which the carbon dioxide is to be separated through the slurry made up of water 404 and the sorbent pebbles 406. The carbon dioxide can be transported to an injection site for sequestration and long-term storage in any of a variety of suitable geologic formations.

Example 5

Figure 5:
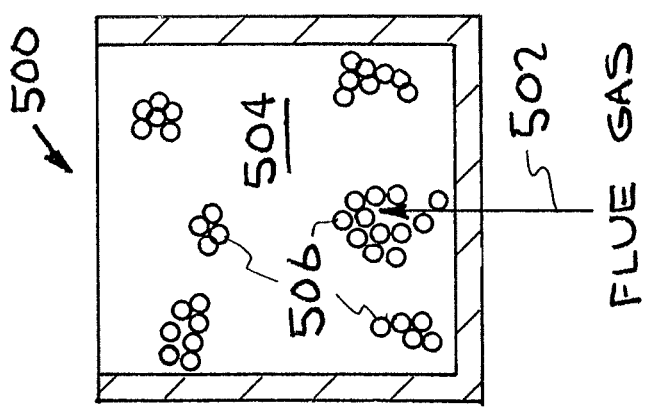
FIG. 5 illustrates an embodiment wherein flue gas is introduced to a fluidized bed reactor containing the slurried pebbles.

Referring now to FIG. 5 another embodiment of a method of the present invention is illustrated. This embodiment of a method of the present invention is designated generally by the reference numeral 500. FIG. 5 is an illustration showing flue gas introduced to a fluidized bed reactor containing slurried pebbles. As illustrated in FIG. 5 flue gas 502 is introduced to a fluidized bed 504. The fluidized bed 504 is made up of sorbent pebbles 506. The sorbent pebbles 506 include a sorbent pebble body and a surface layer with an attached or embedded catalyst or enzyme. One embodiment of the sorbent pebble 506 is illustrated in FIG. 1 and described above. Carbon dioxide is absorbed by passing the flue gas 502 from which the carbon dioxide is to be separated through the fluidized bed 504. The carbon dioxide can be transported to an injection site for sequestration and long-term storage in any of a variety of suitable geologic formations.

Example 6

Figure 6:
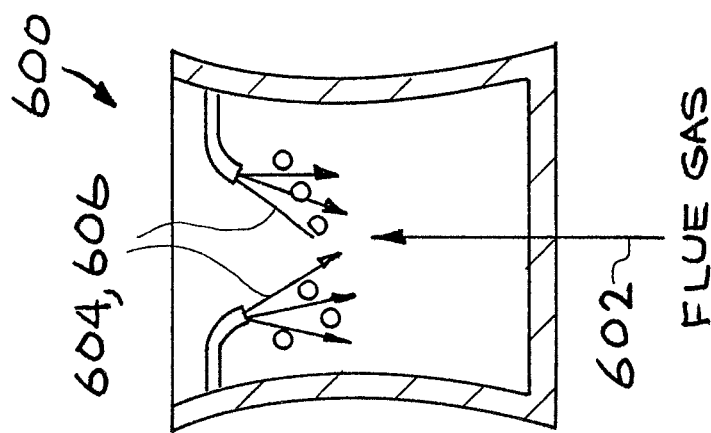
FIG. 6 illustrates an embodiment wherein the pebbles are part of the spray system.

Referring now to FIG. 6 another embodiment of a method of the present invention is illustrated. This embodiment of a method of the present invention is designated generally by the reference numeral 600. FIG. 6 is an illustration showing sorbent pebbles as part of a spray system. As illustrated in FIG. 6 flue gas 602 is introduced to a spray system. The spray includes water 604 and sorbent pebbles 606. The sorbent pebbles 606 include a sorbent pebble body and a surface layer with an attached or embedded catalyst or enzyme. One embodiment of the sorbent pebble 606 is illustrated in FIG. 1 and described above. Carbon dioxide is absorbed by passing the flue gas 602 from which the carbon dioxide is to be separated through the spray that includes water 604 and sorbent pebbles 606. The carbon dioxide can be transported to an injection site for sequestration and long-term storage in any of a variety of suitable geologic formations.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An apparatus for separation of carbon dioxide from a gas mixture containing the carbon dioxide, comprising:
    a water wash, said water wash including a spray system wherein the gas mixture is washed with water by said spray system and wherein the carbon dioxide in the gas mixture is dissolved in said water producing carbon dioxide laden water,
    an absorbing media made of a multiplicity of pebbles with each pebble being a porous sorbent pebble, said porous sorbent pebble including
    a sorbent pebble body made of absorbent material that absorbs carbon dioxide and
    a surface layer surrounding said sorbent pebble body, said surface layer having an embedded catalyst or enzyme that speeds the uptake of carbon dioxide,
    said water wash including an area wherein a slurry is formed of said absorbing media and said carbon dioxide laden water wherein said embedded catalyst or enzyme and said absorbent material takes up the carbon dioxide from said carbon dioxide laden water, and
    a heating unit adapted to heat said absorbing media wherein said absorbing media is heated thereby driving off the carbon dioxide whereby the apparatus with said absorbing media made of a multiplicity of pebbles with each pebble being a porous sorbent pebble provides separation of the carbon dioxide from the gas mixture.

2. An apparatus for separation of carbon dioxide from a gas mixture containing the carbon dioxide, comprising:
- a water wash, said water wash including a spray system wherein the gas mixture is washed with water by said spray system and wherein the carbon dioxide in the gas mixture is dissolved in said water producing carbon dioxide laden water,
- an absorbing media made of a multiplicity of pebbles with each pebble being a porous sorbent pebble, said porous sorbent pebble including
- a sorbent pebble body made of absorbent material that absorbs carbon dioxide and
- a surface layer surrounding said sorbent pebble body,
- a catalyst attached to said surface layer providing an attached catalyst or enzyme that speeds the uptake of carbon dioxide,
- said water wash including an area wherein a slurry is formed of said absorbing media and said carbon dioxide laden water wherein said attached catalyst or enzyme and said absorbent material takes up the carbon dioxide from said carbon dioxide laden water, and
- a heating unit adapted to heat said absorbing media wherein said absorbing media is heated thereby driving off the carbon dioxide whereby the apparatus with said absorbing media made of a multiplicity of pebbles with each pebble being a porous sorbent pebble provides separation of the carbon dioxide from the gas mixture.

3. A system for separation of carbon dioxide from a gas mixture containing the carbon dioxide, comprising:
- a water washing unit wherein the gas mixture is washed with water and wherein the carbon dioxide in the gas mixture is dissolved in said water producing carbon dioxide laden water,
- an absorbing media made of a multiplicity of porous sorbent pebbles, each of said porous sorbent pebbles including
- a sorbent pebble body made of absorbent material that absorbs carbon dioxide and
- a surface layer surrounding said sorbent pebble body, said surface layer having an embedded catalyst or enzyme that speeds the uptake of carbon dioxide,
- a slurry unit wherein a slurry is formed of said absorbing media and said carbon dioxide laden water wherein said embedded catalyst or enzyme and said absorbent material takes up the carbon dioxide from said carbon dioxide laden water, and
- a heating unit wherein said absorbing media is heated driving off the carbon dioxide whereby said absorbing media made of porous sorbent pebbles provides separation of the carbon dioxide from the gas mixture.

4. A system for separation of carbon dioxide from a gas mixture containing the carbon dioxide, comprising:
- a water washing unit wherein the gas mixture is washed with water and wherein the carbon dioxide in the gas mixture is dissolved in said water producing carbon dioxide laden water,
- an absorbing media made of a multiplicity of porous sorbent pebbles, each of said porous sorbent pebbles including
- a sorbent pebble body made of absorbent material that absorbs carbon dioxide and
- a surface layer surrounding said sorbent pebble body, said surface layer having an attached catalyst or enzyme that speeds the uptake of carbon dioxide,
- a slurry unit wherein a slurry is formed of said absorbing media and said carbon dioxide laden water wherein said attached catalyst or enzyme and said absorbent material takes up the carbon dioxide from said carbon dioxide laden water, and
- a heating unit wherein said absorbing media is heated driving off the carbon dioxide whereby said absorbing media made of porous sorbent pebbles provides separation of the carbon dioxide from the gas mixture.

\* \* \* \* \*